United States Patent [19]
Reich

[11] Patent Number: 5,830,275
[45] Date of Patent: Nov. 3, 1998

[54] PAPER COATING APPARATUS

[75] Inventor: Stefan Reich, Heidenheim, Germany

[73] Assignee: Voith Sulzer Papiermaschinen GmbH, Germany

[21] Appl. No.: 666,452

[22] PCT Filed: Apr. 21, 1995

[86] PCT No.: PCT/DE95/00544

§ 371 Date: Jun. 27, 1996

§ 102(e) Date: Jun. 27, 1996

[87] PCT Pub. No.: WO95/30795

PCT Pub. Date: Nov. 16, 1995

[30] Foreign Application Priority Data

May 4, 1994 [DE] Germany ................ 44 15 581.6

[51] Int. Cl.$^6$ .................................................. B05C 1/00
[52] U.S. Cl. ........................ 118/641; 118/58; 118/62; 118/67; 118/68; 118/227; 118/244; 118/261; 34/114
[58] Field of Search ................ 118/641, 58, 62, 118/67, 68, 227, 244, 261; 34/114, 115, 117

[56] References Cited

U.S. PATENT DOCUMENTS

| | | |
|---|---|---|
| 4,369,584 | 1/1983 | Daane . |
| 4,665,631 | 5/1987 | Villalobos ................. 34/114 |
| 4,716,660 | 1/1988 | Thiele ..................... 34/114 |
| 4,821,429 | 4/1989 | Sieberth ................... 34/114 |
| 5,404,653 | 4/1995 | Skaugen et al. ........... 34/114 |

FOREIGN PATENT DOCUMENTS

| | | |
|---|---|---|
| 2114464 | 7/1994 | Canada . |
| 2133311 | 7/1994 | Canada . |
| 0290194 | 11/1988 | European Pat. Off. . |
| 0528372B1 | 8/1992 | European Pat. Off. . |
| 0507218 | 10/1992 | European Pat. Off. . |
| 4008804 | 9/1990 | Germany . |
| 4302435 | 8/1993 | Germany . |
| 4302437 | 8/1993 | Germany . |
| 8803193 | 5/1988 | WIPO . |

OTHER PUBLICATIONS

Lee, Lester, Choice of Gas vs Electric IR Drying Hinges on Energy Costs, Mills' Needs, Pulp and Paper, May 1982, pp. 108–111.

Quadracci, H. Richard and Vijay Modi, "Cooling of Paper Using Chill Rollers", *Drying Technology*, 10(1), (1992) pp. 199–212.

Dolge, K., Anwendungstechnische und wirstschaftliche Kriterien zum Einsatz von Elektro–IR–Anlagen in Papiermaschinen, *Wochenblatt Fur Papiermfabrikation*23/24, 1992, pp. 958–962.

Plomer, Dipl.–Ing (FH) A., "The Speedsizer and its Application", Voith Publication, p/2771e, p. 3–7 (1988).

German Official Action for German patent appplication P 44 15 581.6 dated 1994.

Adams, Richard J., "The influence of rolls and reels on flutter and windage", *TAPPI Journal*, Nov. 1992, pp. 215–222.

(List continued on next page.)

*Primary Examiner*—Laura Edwards
*Attorney, Agent, or Firm*—Ostrolenk, Faber, Gerb & Soffen, LLP

[57] ABSTRACT

A coating apparatus comprises a device for applying a liquid coating medium to a moving paper web, and a drying device with at least one web deflecting roll which guides the web with the aid of an air cushion and without the web coming into physical contact with the roll. The roll rotates in the direction of movement of the web. The air cushion flows between the web and the deflection roll in the direction of movement of the web. In the vicinity of the deflection roll at least one non-contact drying device is arranged in the path of the web.

17 Claims, 2 Drawing Sheets

OTHER PUBLICATIONS

Dunlop, J., "Recent Developments and Future Trends in Drying", *Converter*, vol. 29, No. 1, Jan. 1992, pp. 16–17.

Anonymous, "Non-contact Drying and Web Handling for Sizing and Coating", *Equip. Mach. Mater.*, vol. 1 No. 4, May–Jun. 1992, p. 21.

Anonymous, "Spooner's Widest Ever Air Turn", *Br. Pap. Mach.*, No. 72, Mar. 1992, p. 1.

Dunlop, J., "Contactless Web Handling and Drying", Paper presented at 1991 Coating Conference May 19–22 1991 Montreal Canada, pp. 439–452.

Riddiford, Alan W., "Airflow between a Paper Web and a Dryer Surface", *TAPPI*, May 1969, vol. 52. No. 5 pp. 939–942.

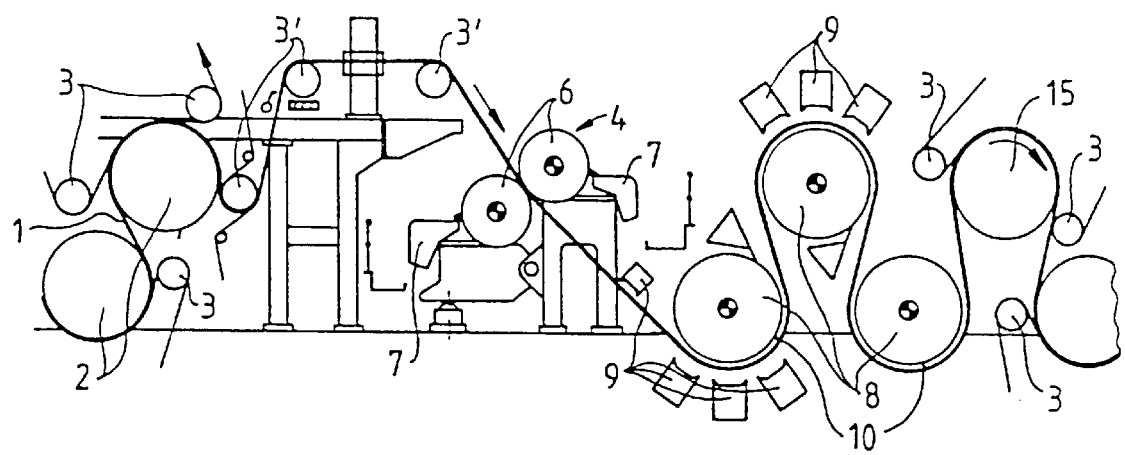
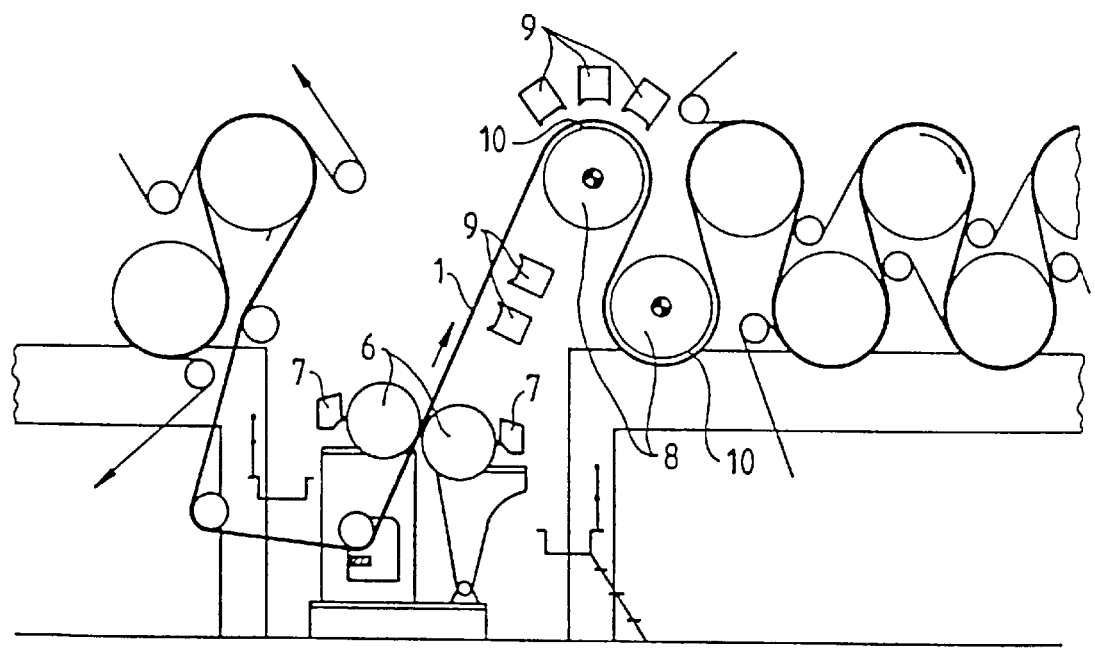

PAPER COATING APPARATUS

BACKGROUND OF THE INVENTION

The invention relates to a paper coating apparatus comprising a liquid coating medium applying device and a drying device, and particularly relates to a contact free web deflecting device for guiding the web at the drying device.

Such an apparatus is known from DE 43 02 435 A1. However, web speeds as high as those with the present invention are not possible with this apparatus. In particular, however, the invention relates to a paper coating device in on-line arrangements known from Voith publication p. 2771, comprising a device for applying a liquid coating medium onto a moving paper web followed by a drying device having at least one deflecting device for the web which guides the web by means by an air cushion.

In accordance with this, in a known coating apparatus, a means for applying a liquid coating medium onto a moving paper web is arranged in the drying unit of a paper making machine. As a rule, this means is located between two drying groups, each of which has several drying cylinders with the usual drying screen (or drying felt) covering and a commonly available drive. The known coating apparatus as well as that according to the present invention can have a pair of rolls for the one-sided or two-sided indirect application of a liquid coating medium or a single roll for the direct application of the coating medium. In the state of the art the drying of the coated paper web ensues either alone through contact drying by means of the following drying cylinders or through a combination of contactless (for example infrared) dryers and contact drying cylinders.

The so-called "Speedsizer" illustrated in FIG. 2 of the above-mentioned Voith publication is only suitable for the application of pigment-free (size-like) coating mediums because only contact drying is intended.

In FIGS. 3 to 5 of the above-mentioned Voith publication, the application of pigment-containing coating mediums (simultaneously on both web sides) is possible because additional contactless dryers (for example, infrared dryers) are provided upstream of the contact dryers. However, there is a very long passage of the web with sharp deflections from the application device up to the first contact dryer. On account of the associated risk of web tears, such a web guidance is unsuitable for the very high web speeds demanded today.

Therefore, all known arrangements have in common that the maximum possible operation speed is strictly limited. This is also the case in respect of FIG. 5 of the mentioned Voith publication and the coating device described in DE 43 02 435 A1 as a result of the contactless, stationary "Air turn" web deflection devices which are required in this. The contactless, stationary "Airturn" web deflection devices are known to operate with impact air flow, which subjects the web (wet in the application means) to a high load.

The invention is based on the object of improving the initially described known paper coating apparatus in such a manner that it is suitable for very high operating speeds and, in particular, for the application of pigment-containing coating mediums, preferably with simultaneous two-sided application.

The object of the invention is accomplished by having the web deflecting device of the invention comprise the web deflection roll which rotates in the direction of movement of the web through the coating apparatus. Means form an air cushion for flowing between the web and the deflection roll and for flowing in the direction of movement of the web. At least one contactless drying device is arranged in the area of the deflection roll along the path of movement of the web.

Preferably, the air cushion is formed so that it flows between the web and the deflection roll, and flows at least approximately at the speed of the web. The air cushion may be produced by the boundary layer of air that is drawn along with the web to the deflection roll. The peripheral speed of the deflection roll may be adjusted to a value which is as the same as or greater than the speed of the web there passing. The means that provide the air cushion may comprise an air nozzle at the web feed side of the deflection roll which produces the air cushion that flows together with the web between the web and the deflection roll. Alternately, to provide the air cushion, the deflection roll may be an air blowing roll with a perforated roll surface and a preferably stationary blow box which opens toward the wrapping zone of the web to form the blowing zone.

Following the application means, as a rule directly, there is at least one rotary deflection roll around which the web is wrapped, but the arrangement is such that the web floats at the periphery of the deflection roll on an air cushion flowing with the web so that it does not contact the roll surface.

Therefore, is this invention, the air flowing in with the web is purposefully used to produce this air cushion. On the contrary, in an apparatus for coating or printing paper described in U.S. Pat. No. 4 369 584, the air drawn in with the web is to be strictly avoided.

In accordance with the invention, the web is simultaneously dried of at least one contactless drying means (for example, an infrared dryer) to the extent that it can be completely dried immediately after this by means of commonly known contact drying.

The inventive deflection roll with the contactless drying means arranged on its periphery can be briefly referred to as a "rotating Airturn web guiding and drying system", in contrast to the known stationary Airturn web guiding apparatus.

The invention makes it possible to coat a paper web (within the paper making machine or in a separate coating unit) on one side or both sides at desirable and even very high web speeds with a desirable (also a pigment-containing and/or high consistency) medium and to then immediately dry this.

The success is principally based on the fact that as a result of the air cushion flowing with the web (avoidance of an impact flow) at the periphery of the deflection roll, an extremely placid and stable web guidance can be achieved. This makes it possible to arrange contactless (for example, infrared) dryers exactly at the periphery of the deflection roll. On account of this, it is possible in an advantageous manner to make the passage of the web from the application means up to the mentioned deflection roll relatively short and straight, which also contributes to a stable web passage without the risk of tearing. Simultaneously, the preferably smooth and highly polished surface of the deflection roll acts as a reflector for the infrared dryer or dryers.

The invention can be realized with any application device, i.e. both those for direct application and those for indirect application of the coating medium onto the web. However, the latter is preferred because it also contributes to a stable, low-tear web guidance. In other words, the passage efficiency (the "runability") is increased even further.

BRIEF DESCRIPTION OF THE DRAWINGS

Exemplary embodiments of the invention are schematically illustrated in the drawings, in which:

FIG. 1 shows in side view a section of a paper machine with the inventive paper coating device arranged between two drying groups within the dryer arrangement, FIG. 2 shows the section of a paper machine according to FIG. 1, but with an altered paper web guidance.

DESCRIPTION OF THE PREFERRED EMBODIMENT

Figure 3:
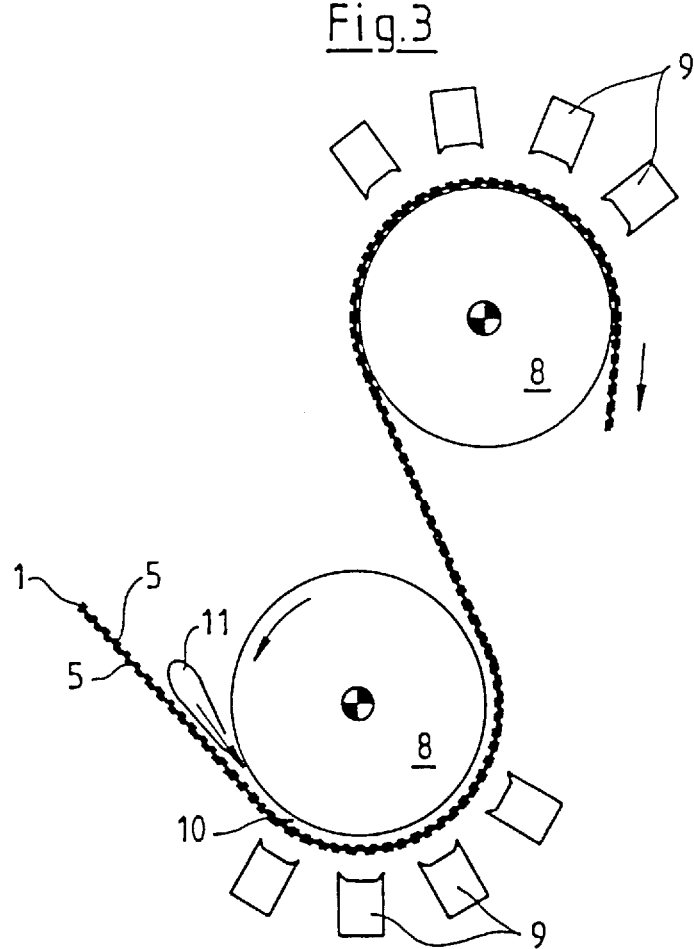
FIG. 3 shows two inventive deflection rolls in side view with an air nozzle.

It can be seen in FIGS. 1 and 2 that a paper web 1 initially passes through a pre-drying unit, including the last two drying cylinders 2 shown in section. The paper web 1 is pressed onto the drying cylinders by means of endless pressing belts which pass over web guiding rolls 3.

After this, the paper web 1 passes (as illustrated, in the direction from above to below in FIG. 1 and from below to above in FIG. 2) several paper guide rolls 3 and an application device 4 for applying a liquid coating medium 5 onto a moving paper web 1 (which is marked with dashes in FIG. 3) for improving the surface of the paper to be produced, such as by means of color or gloss.

The application means 4 consists of a pressing roll pair 6, the pressing rolls being provided with a suitable drive and, as can be seen in FIGS. 1 and 2, having two feeders 7 for the indirect application of the desired coating medium 5 on to the rolls 6 and from the rolls on to the web. The coating medium 5 can in this case be applied onto the roll pair 6 by means of a nozzle application unit. However, the coating medium 5 can also be applied by means of dosing rolls which are arranged upstream of the rolls or even only one of the rolls of the roll pair 6.

However, the application of medium can also be performed directly. In this case, only a single roll 6 must be present, which in these circumstances is a supporting roll. It is possible in this case to apply the coating medium onto one side of the web in a direct manner and onto the other side of the web in an indirect manner.

At least one deflection roll 8 follows the application means 4. In the variant illustrated in FIG. 1, there are three deflection rolls 8 with their own drives. On the contrary, in the variant according to FIGS. 2 and 3, there are only two deflection rolls 8.

The peripheral speed of a deflection roll 8 is adjusted so that it is the same as or greater than the web speed.

The diameter of the deflection roll 8 is at least 1 m. Diameters of 1.2 to 1.8 m have proved to be particularly advantageous, depending on the peripheral speed to be achieved.

Contactless drying devices 9 radiate from the outside both onto the straight passage of the paper web 1 in the region from the application means 4 up to the first deflection roll 8 and onto the paper web 1 wrapped around the deflection roll 8.

Infrared dryers have been selected as the drying devices. However, it is also possible to install gas or electrical dryers.

The paper web 1 moves with a web speed of at least 1000 m/min. around the two deflection rolls 8 so that an air cushion 10 is produced between the paper web 1 and the deflection rolls 8 on account of the air boundary layer pulled along by the web and the air cushion carries the paper web 1 together with the coating medium 5 in this area.

A particularly intensive formation of the air cushion 10 has been shown at web speeds of approximately 1500 to 2000 m/min.

In addition to those previously described, the creation of the air cushion 10 moving with the deflection roll 8 has the further advantage that an "engagement" of the rolls is prevented by means of this so-called "floating effect".

As illustrated in FIG. 3, the formation of the air cushion 10 can be supported by an air nozzle 11. This is particularly useful when the web speed is less than previously indicated, i.e. the paper machine runs more slowly. The air nozzle 11 makes it possible in an easy manner to blow air into the desired area between the paper web 1 and the deflection roll 8.

Figure 4:
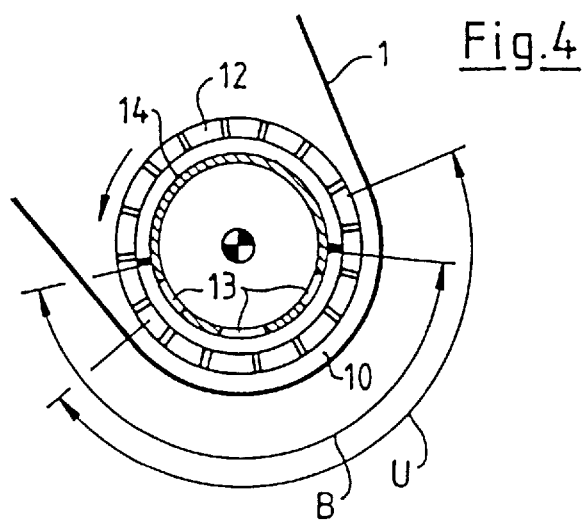
FIG. 4 shows the inventive deflection roll in cross section designed as an air blowing roll.

A further variant for forming the air cushion 10 is shown in FIG. 4.

In this case, the air roll 8 is formed as an air blowing roll.

It has a perforated roll surface 12 and a stationary blow box 14 provided with openings 13 that open towards the wrapping zone U.

It can also be seen in FIG. 4 that, in the case of the roll 8 being viewed in cross section and the passage of the web being in the direction indicated by the arrow, the blowing zone B begins ahead of the wrapping zone U and ends before this does. This prevents leaking air from flowing away without being used.

In all three variants for producing the air cushion (namely high web speed, air nozzle and air blowing roll), a rotation-like air flow and no radial, so-called impact flow as in the known "air turn" devices is produced, on account of which the paper web 1 is protected to the greatest possible extent. This characteristic is particularly advantageous in the case of treating the paper web 1 with a pigment-containing coating medium 5. This also makes it possible to perform a simultaneous application on both sides.

Following the contactless drying, which one can also call "high speed drying", the paper web 1 passes in the usual manner into a further drying device with known contact dryers 15, the paper web also in this case being pressed against the cylinders by respectively one upper and one lower pressing belt (guided over belt guiding rolls 3).

I claim:

1. A paper coating apparatus, comprising:
   means for moving a paper web to be coated on a web path;
   a device for applying a liquid coating medium onto at least one side of the moving paper web;
   a drying device downstream of the applying device on the web path for drying the coating medium on the paper web, the drying device including:
   at least one web deflecting roll for guiding the web by means of an air cushion, without contact of the web on the deflecting roll, the web deflecting roll being rotatable in the direction of movement of the web on the web path past the deflecting roll; guide means for guiding the web on the web path past the deflecting roll;
   means generally at the deflecting roll for forming an air cushion to flow in the direction of the movement of the web and to flow between the web and the deflecting roll about which the web is guided on the web path past the deflecting roll; and
   at least one contactless drying device generally in the area of the deflecting roll along the web path for drying the medium on the web.

2. The apparatus of claim 1, wherein the air cushion forming means are for forming the air cushion for flowing between the web and the deflecting roll and for causing the air cushion to flow at least approximately at the speed of movement of the web past the deflecting roll.

3. The apparatus of claim 2, wherein the means for forming and for causing the air cushion to flow includes means for adjusting the web speed to least 1,000 m/min, such that the air boundary layer along the web may produce the air cushion.

4. The apparatus of claim 3, wherein the means for causing the air cushion to flow adjusts the web speed to a speed in the range of 1,500 to 2,000 m/min.

5. The apparatus of claim 2, wherein the means for causing the air cushion to flow adjusts the peripheral speed of the deflecting roll to at least the web speed.

6. The apparatus of claim 3, wherein the diameter of the deflecting roll is at least 1 m.

7. The apparatus of claim 6, wherein the diameter of the deflecting roll is in the range of 1.2 to 1.8 m.

8. The apparatus of claim 2, wherein the diameter of the deflecting roll is at least 1 m.

9. The apparatus of claim 1, wherein the means for forming the air cushion includes an air nozzle at the web at on in feed side of the deflecting roll along the web path, the nozzle being shaped and positioned for producing an air cushion that flows together with the web between the web and the deflecting roll.

10. The apparatus of claim 1, wherein the air cushion forming means comprises the deflecting roll including an air blowing roll for blowing air from inside the roll into the space between the deflecting roll and the web for forming the air cushion.

11. The apparatus of claim 10, wherein the air blowing roll includes a perforated roll surface and a blow box within the roll blowing air out the roll surface.

12. The apparatus of claim 10, wherein the guide means guides the web around the deflecting roll to define a wrap zone of the web around the surface of the roll and the roll surface is perforated to define a blow zone for blowing air into the air cushion between the deflecting roll and the web.

13. The apparatus of claim 12, wherein the blow zone begins around the deflecting roll before the start of the wrap zone of the web and the blow zone ends around the deflecting roll before the end of the wrap zone of the web.

14. The apparatus of claim 2, wherein the guide means are positioned for so guiding the web and the deflecting roll is so positioned that the web path through the apparatus is a straight line from the coating medium applying device to the deflecting roll.

15. The apparatus of claim 1, further comprising an additional contactless drying device located before the deflecting roll along the web path from the coating medium applying device to the deflecting roll.

16. The apparatus of claim 2, wherein the coating medium applying device includes a press roll pair at opposite sides of the web and comprises at least one coating medium feed for indirectly applying coating medium onto the web by applying coating medium to at least one of the roll pair.

17. The apparatus of claim 16, wherein there is a respective coating medium feed for indirectly applying coating medium onto each side of the web by applying coating medium to the respective press roll of the roll pair at opposite sides of the web.

\* \* \* \* \*